May 27, 1952 A. MARRA 2,598,574

DISK OPERATED ELECTRIC PLAYER FOR CARILLONS

Filed May 27, 1949 4 Sheets-Sheet 1

INVENTOR.
Anthony Marra
BY Richardson Geier
ATTORNEYS

May 27, 1952 A. MARRA 2,598,574

DISK OPERATED ELECTRIC PLAYER FOR CARILLONS

Filed May 27, 1949 4 Sheets-Sheet 2

INVENTOR.
Anthony Marra
BY Richards & Geier
ATTORNEYS

DISK OPERATED ELECTRIC PLAYER FOR CARILLONS

Filed May 27, 1949

INVENTOR
Anthony Marra
BY Richardson Geier
ATTORNEYS

May 27, 1952 A. MARRA 2,598,574

DISK OPERATED ELECTRIC PLAYER FOR CARILLONS

Filed May 27, 1949 4 Sheets-Sheet 4

INVENTOR
Anthony Marra
BY Richards & Geier
ATTORNEYS

Patented May 27, 1952

2,598,574

UNITED STATES PATENT OFFICE 2,598,574

DISK OPERATED ELECTRIC PLAYER FOR CARILLONS

Anthony Marra, Manhasset, N. Y.

Application May 27, 1949, Serial No. 95,662

6 Claims. (Cl. 84—103)

This invention relates to a carillon player.

It is an object of this invention to provide a carillon player which can be operated by a large flexible disk having openings therein through which finger contacts can be extended to establish electric circuits for operating the hammers or actuating elements for the chimes or bells to be rung by the player and wherein the operating mechanism for supporting the disk permits the disk to be flexed into a small space so that the operating box can be kept to minimum size.

It is another object of the present invention to provide a carillon player box having a support for the disk longitudinally of the same but of less width than the diameter of the disk and which is curved to permit an even bending of the disk and a drive operable upon the periphery of the disk and getting its power from an electric motor within the box and a contact finger arrangement adapted to be elevated out of the box after the cover has been raised by pivotal movement to permit the removal and replacement of the disk.

Other objects of the present invention are to provide a carillon player of a box type which is of simple construction, inexpensive to manufacture, easy to operate, compact and efficient in operation.

For other objects and/or a better understanding of the invention, reference may be had to the following detailed description taken in connection with the accompanying drawing, in which Fig. 1 is a perspective view of the player with the cover and the contact pick up device elevated, Fig. 2 is an enlarged sectional view taken generally on line 2—2 of Fig. 1 but with the contact pick up device lowered onto a record disk, Fig. 3 is a fragmentary perspective view of one of the contact fingers, Fig. 4 is an enlarged fragmentary and sectional view of one of the contact fingers extending through a hole in a disk and in engagement with a contact on the record support, Fig. 5 is an enlarged fragmentary and perspective view of the record disk in place on the support and bent downwardly over the sides thereof, the drive wheel engaging with the bottom periphery of the disk and the contact finger assembly lowered into place, Fig. 6 is an enlarged perspective and fragmentary view of the contact finger device.

Figures 5, 6, 7:
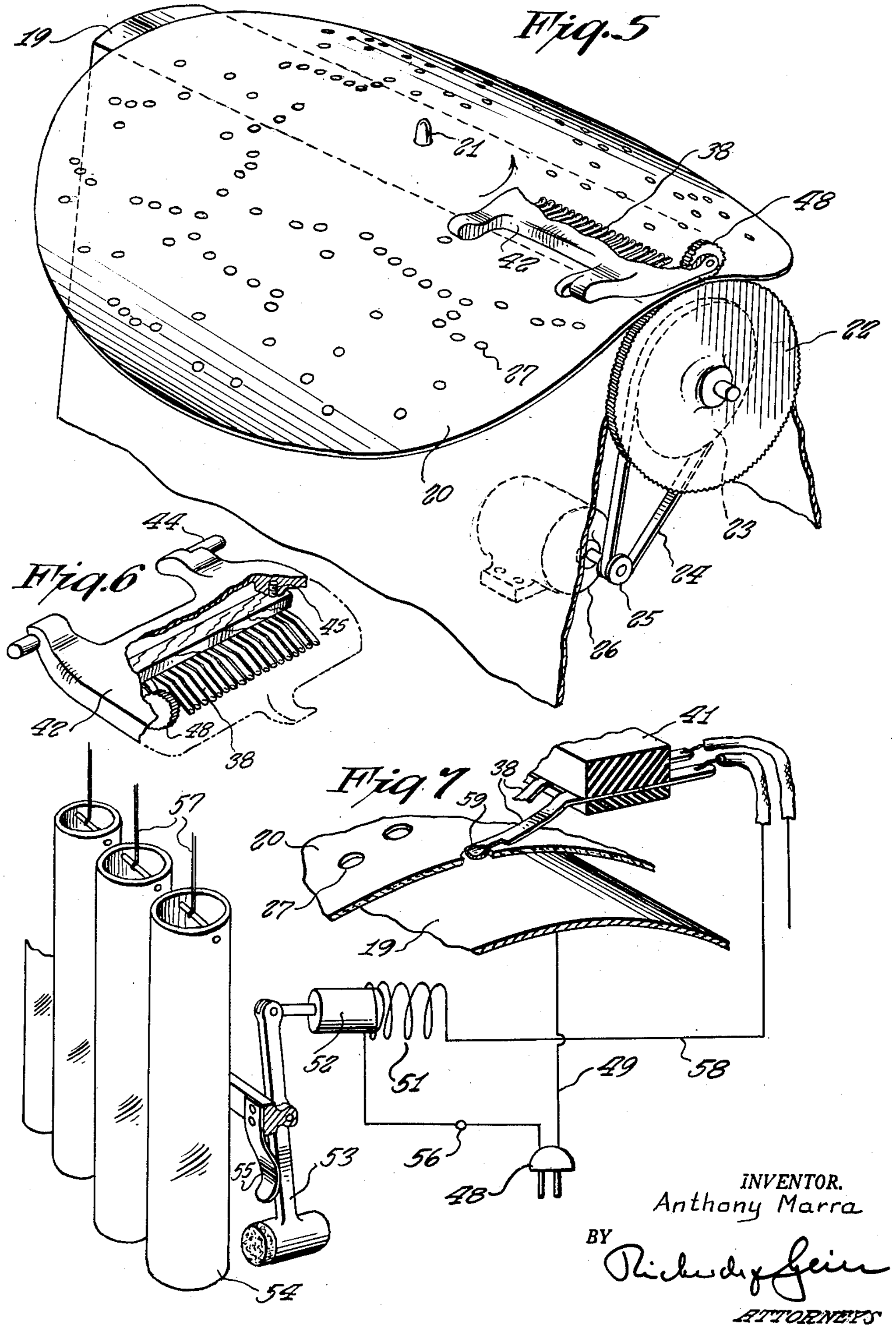
Fig. 7 is a fragmentary and sectional view of the finger contact and of the disk and support for the disk of the operating mechanism and bells or chimes being struck by the operating mechanism, the view also showing the wiring diagram through the contact finger, the contact elements on the supporting plate and the solenoid for the operating device.

Referring now to Figures 1 to 7, 10 represents a box adapted to house the various parts of the player. This box has a top cover 11 hinged at 12 for closing a top opening 13. Forwardly of this top opening is a top panel 14 having a switch button 15 and a control knob 16. Extending upwardly from the bottom of the box are opposing inwardly inclined supports 17 and 18 over which is extended an upwardly curved record support 19 over which disk 20 is rotated. By having the support curved the flexible disk 20 can be bent downwardly at the opposite sides thereby conserving space within the box. The disk as shown in Fig. 5 is bent down over support 19 and is centered on a pivot post 21. The periphery of the disk engages with a large serrated drive wheel 22 connected with a pulley 23 operated by a belt 24 connected with a small pulley 25 of an electric motor 26. The disk 20 has a plurality of holes 27 arranged in circumferentially spaced relation and in circular rows according to the music piece to be rendered.

Figure 1:
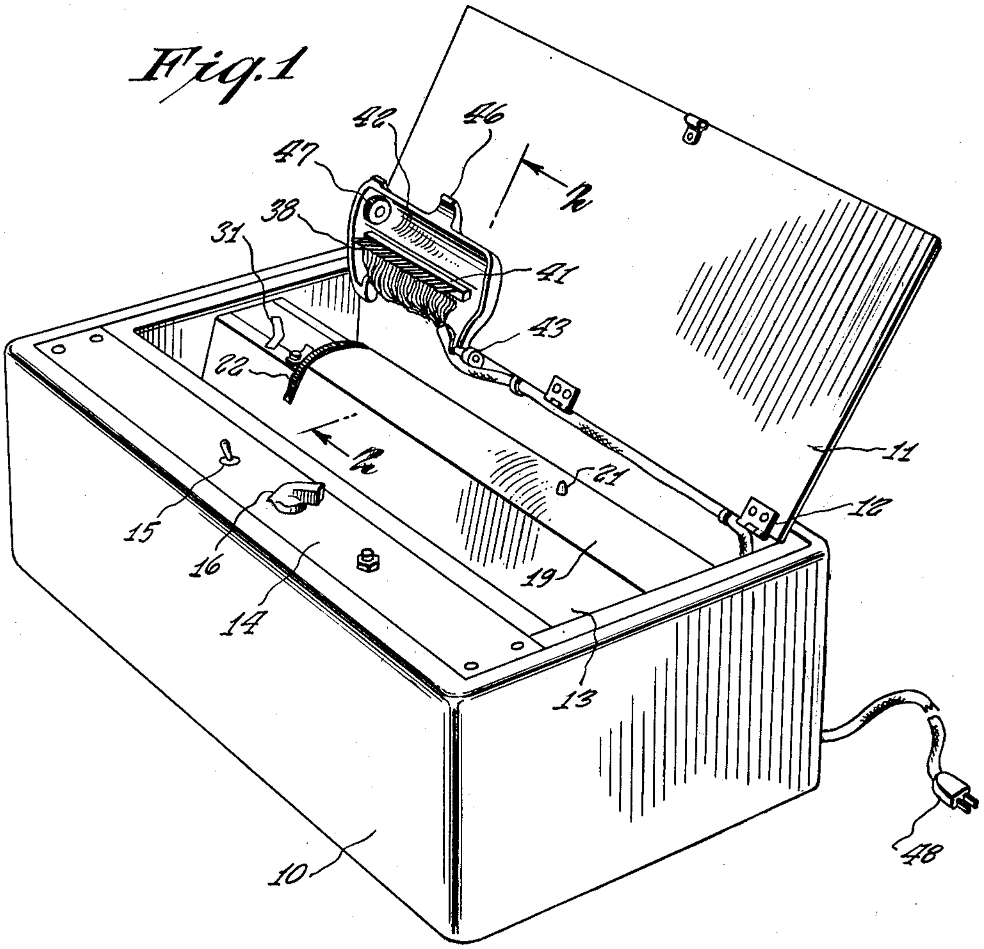
Figures 2, 3, 4:
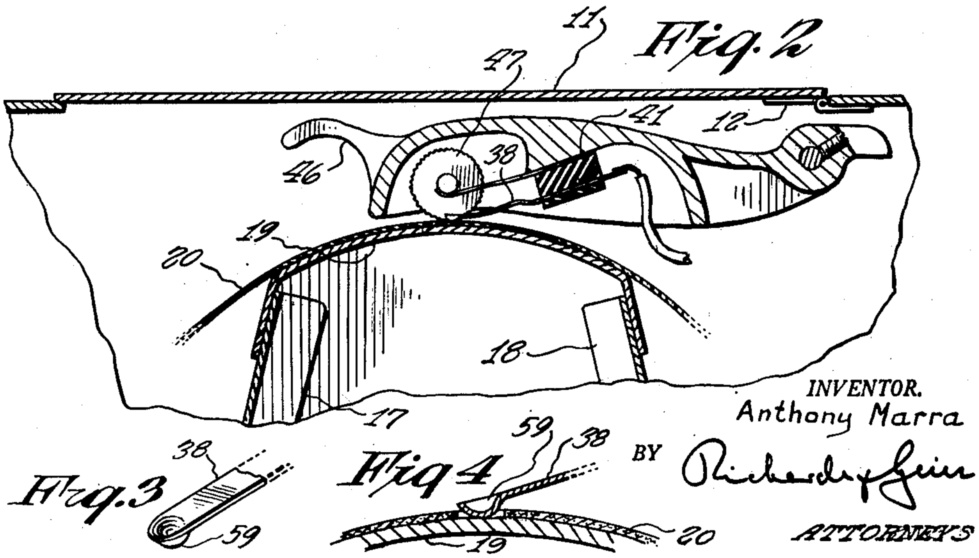

As shown in Fig. 1 a holding spring 31 is used to hold a pick up member 42 in the downward position of the latter.

There are a series of contact fingers 38 and these fingers are supported by an insulating member 41 carried in the pick up member 42 pivotally connected to brackets 43 on the box. The pick up member 42 has trunnion or hinge projections 44 for connection with the hinge brackets 43. The insulating member 41 is secured to the pick up member 42 by fastening screws 45. The pick up member has a handle portion 46 under which the finger can be extended to lift the same. The pick up member 42 also has a resiliently supported serrated wheel 47 for engagement with the top surface of the disk 20 to maintain the disk periphery upon the driving serrated wheel.

A plug 48 can be inserted in a wall receptacle and has a wire 49 extending to the support 19.

A solenoid 51 is provided for each operating member 52 connected to a hammer 53 adapted to engage a bell or chime 54. A spring 55 returns the hammer 53 after it has been actuated by the solenoid 51. Each solenoid 51 is connected to a common terminal at 56 which is in turn connected to plug 48. The bells 54 can be suspended respectively by cords 57 at any location at a distance from the box.

Each solenoid 51 is connected by a wire 58 to the contact finger 38. Each contact finger 38 has a semi-spherical formation 59 which will extend through an opening 27 in the record 20 for engagement with the record support 19 to complete the electric circuit.

It should now be apparent that there has been provided a carillon player which is of simple construction and adapted to house a large record disk with the support therefor having to extend the full diameter of the disk and wherein the disk can be folded down over the support to conserve space.

It should be apparent that the disk will easily flow over the smooth curved surface of the support and will be positively driven by a simple drive mechanism including a serrated drive wheel 22 engaging with the under surface of the disk at the periphery thereof.

While various changes may be made in the detail construction, it should be understood that such changes shall be within the spirit and scope of the present invention as defined by the appended claims.

Figure 8:
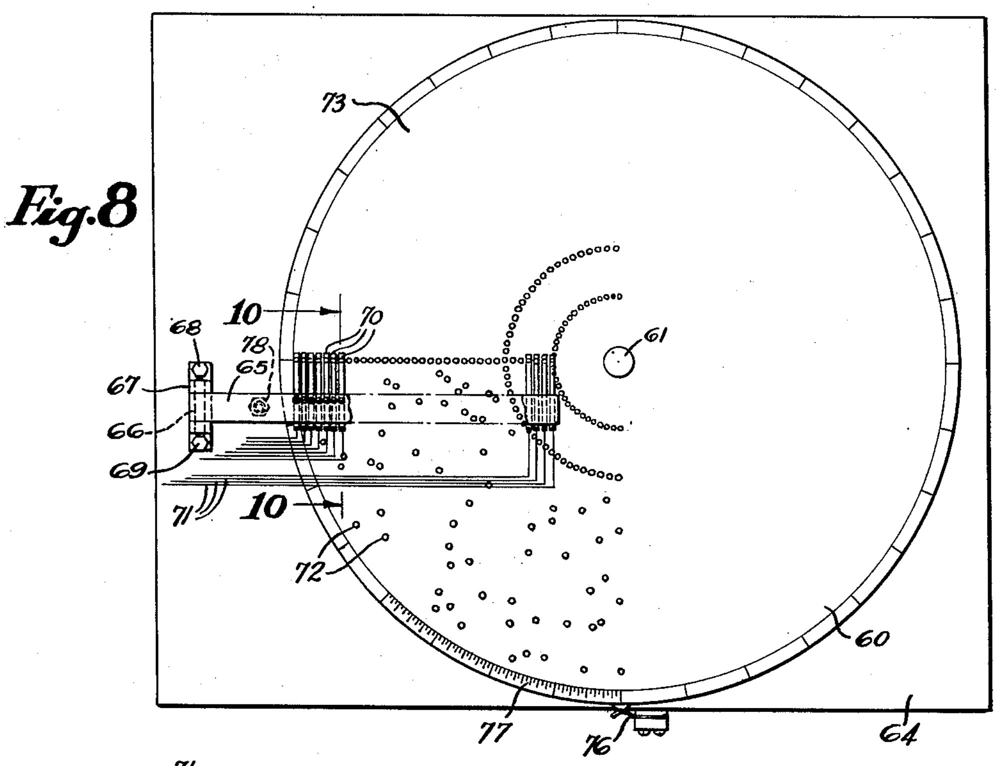
Fig. 8 is a top view of another modification of the inventive idea.
Figure 9:
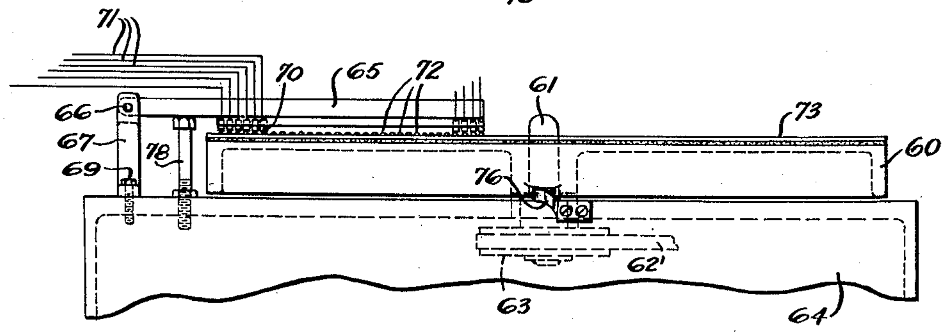
Fig. 9 is a side view partly in section.
Figure 10:
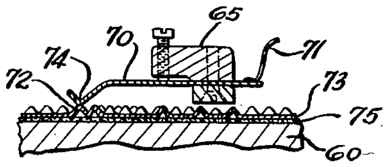
Fig. 10 is a top view along the line 10—10 of Fig. 8 and on an enlarged scale.

The construction shown in Figures 8 to 10 consists of a disc-shaped turntable 60 of the usual type which is mounted upon a pivot post 61 and which is driven by a motor (not shown) actuating a belt 62 and a pulley 63 keyed upon the post 61. A box 64 carries the post 61 and a pick-up arm 65 which is hinged at 66 to an upright support 67. The support 67 is connected by screws 68 and 69 with the box 64.

The arm 65 carries conductive fingers 70 which are connected by separate wires 71 to circuits (not shown) which when closed, cause the actuation of the chimes.

In this construction, the closing of these circuits is caused by projections 72 of a record 73 which engage curved ends 74 of the fingers 70 (Fig. 10).

A circuit is interrupted as soon as a projection 72 is moved out of contact with the end 74 of the corresponding finger 70.

The record 73 is carried upon the felt covering 75 of the turntable 60 and is made of a conducting material. A contact 76 is used to connect electrically the record 73 with the circuits of the wires 71. The record 73 may be provided with a circumferential scale of indicia 77.

The proper position of the fingers 70 directly above the record 73 is maintained by an adjusting stop 78 which is screwed into the top surface of the box 64.

The operation of the player is apparent from the above description. Obviously, further changes may be made in this player within the scope of the appended claims.

Figures 11, 12, 13:
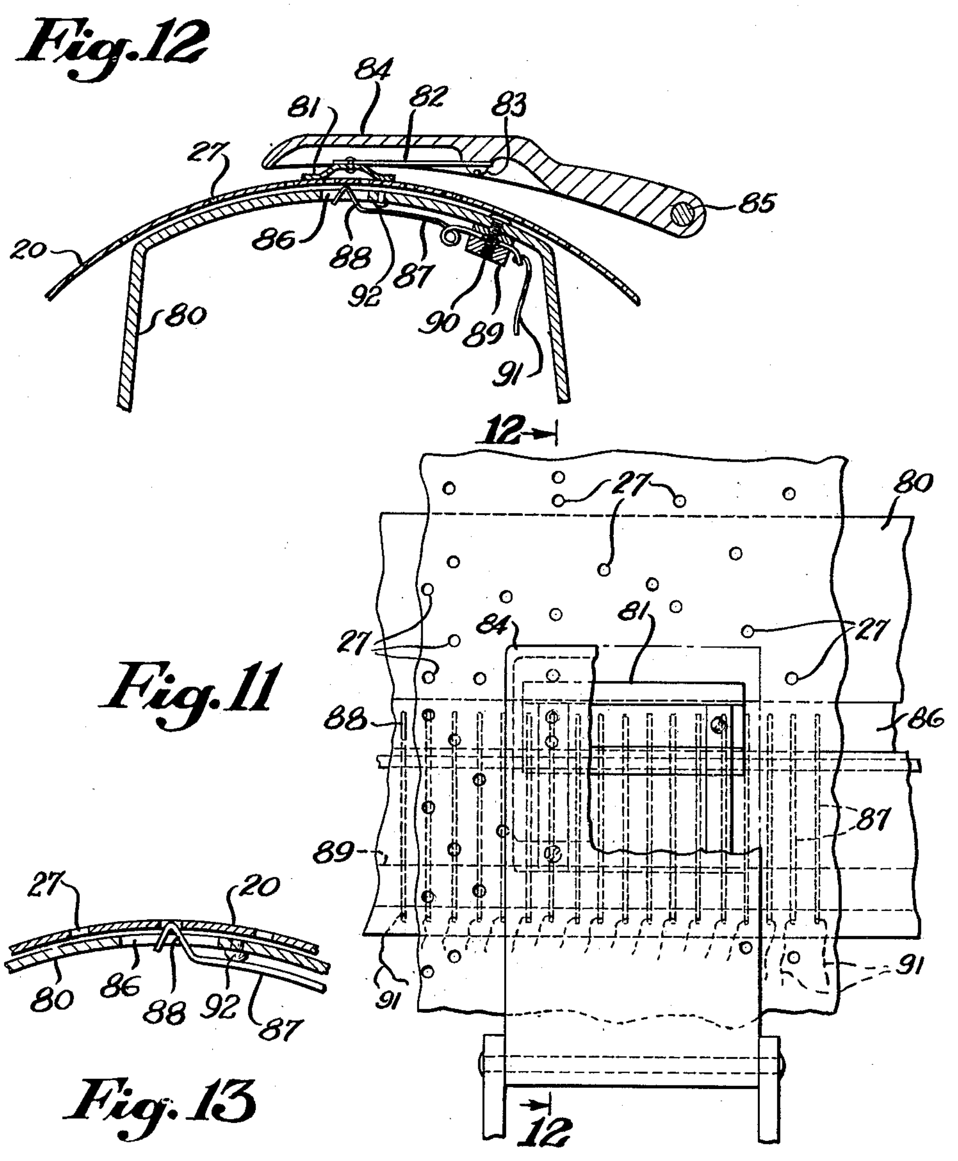
Figure 11 is a fragmentary top view of another device.
Figure 12 is a section along line 12—12 of Fig. 11.
Fig. 13 is an enlarged sectional view.

In the construction shown in Figures 11, 12, and 13, a flexible record or disc 20 is located upon an upwardly curved record support 80. The record 20 is provided with the holes 27 corresponding to the various notes, and is rotated upon the support 80 by any suitable means (not shown).

The record 20 is pressed against the underlying surface of the support 80 by a hold-down shoe 81 which is held by two or more flat springs 82. The springs 82 are supported by screws 83 which are mounted upon the under-surface of a curved casing 84. The casing 84 is pivoted at 85 to a frame or box which is not shown in the drawing.

The shoe 81 extends over an elongated opening 86 provided in the support 80. Resilient contact fingers 87 are located below the support 80 and are provided with bent portions 88 extending through the opening 86 and adapted to be engaged by the record 20. The fingers 87 are held parallel to each other by a support 89 which is held by screws 90 upon an underlying surface of the support 80. The inner ends of the fingers 87 are connected with wires 91 leading to a fill-actuating device of the usual type which is not shown in the drawings. The same device is also electrically connected to contact buttons 92 which are attached to the underlying surface of the support 80 close to the opening 86 and insulated from the support.

It is apparent that the pressure of the record 20 against the projecting portions 88 of the resilient fingers 87 will maintain the fingers out of engagement with the contact buttons 92, so that the circuits of the bell-ringing device will be open. However, as soon as a hole 27 of the record 20 will be located above the projecting portion 88 of a finger 87; that finger will move upwardly and strike a contact button 92, thereby closing a circuit to one of the bells of the bell-ringing device.

In all other respects this mechanism is operated similarly to those previously described.

What is claimed is:

1. An electric player in combination with a carillon, the player comprising a container, the container comprising spaced parallel front and back members and spaced parallel end members secured along corresponding edges and a bottom member disposed over the bases of the other members, a cover member hingedly disposed along the top edge of the back member, an upwardly directed support disposed between the end members and intermediate the front and back members, the front and back surfaces of the support tapering inwardly and upwardly and terminating in a top surface portion of downwardly directed arcuate cross section below the plane of the top of the container, the top surface portion being electrically conductive, a pivot post disposed in the top surface portion substantially at the center, an electrically insulated disk rotatably disposed over the pivot post, means rotating the disk, the disk having openings formed therethrough circumferentially spaced in accordance with the sequence of operation of the bells of the carillon, a pick up member hingedly disposed on the inner surface of the cover member at the bottom, a series of electrically conductive fingers electrically insulated from each other carried by the pick up member and adapted to be brought into electrical contact with the top surface portion of the support when the openings in the disk are rotated thereunder in the closed position of the cover member, a circuit between the top of the support and each finger, a solenoid in the circuit and a bell of predetermined tone in operable engagement with the solenoid.

2. An electric player in combination with a carillon according to claim 1 in which the means rotating the disk comprises a drive wheel rotatably mounted in the support, the plane of the wheel being perpendicular to the longitudinal center line of the support, the rim of the wheel being serrated and in operable engagement with the bottom surface of the disk adjacent the periphery, a second wheel rotatably supported by the pick up member, the rim of the second wheel being serrated and adapted to coact with the drive wheel when the cover member is closed.

3. An electric player in combination with a carillon, the player comprising a disk support, the top of the support being of arcuate cross section and curving outwardly and downwardly, the top of the support further having a longitudinal opening formed therein substantially at the center, a disk electrically insulated from the support rotatably disposed thereover, means rotating the disk, the disk having openings formed therein, the openings being circumferentially spaced in accordance with the sequence of operation of the bells of the carillon, a hold-down shoe coacting with the disk and adapted to maintain the disk in contact with the top surface of the support along the edges of the longitudinal opening, a plurality of contact buttons electrically insulated from the support disposed on the bottom surface thereof adjacent the longitudinal opening, a plurality of contact fingers disposed on the bottom surface of the support, one end of each finger being under upwardly directed tension in the longitudinal opening and adapted to make electrical contact with one of the buttons when the opening in the disk is rotated thereover, the disk normally holding one end of the fingers away from the buttons, means electrically insulating the fingers from each other, a normally open circuit between the contact buttons and the fingers, a solenoid in the circuit, and a bell of predetermined tone in operable engagement with the solenoid.

4. An electric carillon player for use with flexible perforated disks, said player comprising a disk support having an elongated arcuate supporting top surface, and downwardly extending side surfaces carrying said top surface, said top surface being substantially smaller than the flexible disk and being adapted to carry the middle portion of said disk, means supporting said middle portion of the disk for rotation upon said top surface, a plurality of contact fingers, means supporting said fingers substantially parallel to each other adjacent to said disk support to enable said fingers to penetrate the perforations of the disk, and separate means connected with said fingers for closing a chime-actuating circuit when a finger penetrated one of said perforations.

5. An electric carillon player for use with flexible perforated disks, said player comprising a disk support, having a longitudinal opening formed therein, a plurality of contact buttons disposed on the bottom surface of the support adjacent to said opening, a plurality of contact fingers disposed on the bottom surface of the support, one end of each finger being under upwardly directed tension in the longitudinal opening and being adapted to make electrical contact with a separate button when a perforation in a disk is moved thereover, the non-perforated portion of the disk normally holding said ends of the fingers away from said buttons, and means constituting chime-actuating circuits between said fingers and said buttons.

6. An electric carillon player for use with flexible perforated disks, said player comprising a disk support having an elongated arcuate supporting top surface, and downwardly extending side surfaces carrying said top surface, said top surface being substantially smaller than the flexible disk and being adapted to carry the middle portion of said disk, said top surface having a longitudinal opening formed therein substantially in the center, a hold-down shoe located above said top surface and adapted to maintain a disk in contact with the top surface of the support, a plurality of contact buttons disposed on the bottom surface of the support adjacent to said opening, a plurality of contact fingers disposed on the bottom surface of the support, one end of each finger being under upwardly directed tension in the longitudinal opening and being adapted to make electrical contact with a separate button when a perforation in a disk is moved thereover, the non-perforated portion of the disk normally holding said ends of the fingers away from said buttons, and means constituting chime-actuating circuits between said fingers and said buttons.

ANTHONY MARRA.

REFERENCES CITED

The following references are of record in the file of this patent:

UNITED STATES PATENTS

| Number | Name | Date |
|---|---|---|
| 1,322,379 | Wade | Nov. 19, 1919 |
| 1,413,638 | Waldman | Apr. 25, 1922 |

FOREIGN PATENTS

| Number | Country | Date |
|---|---|---|
| 90,351 | Germany | Jan. 25, 1897 |